United States Patent [19]
Budzich et al.

[11] Patent Number: 4,534,254
[45] Date of Patent: Aug. 13, 1985

[54] CABLE STRIPPING APPARATUS

[75] Inventors: Mieczlyslaw Budzich, Lexington; Forest G. Fitz, Jr., West Columbia, both of S.C.

[73] Assignee: AT&T Nassau Metals Corporation, Gaston, S.C.

[21] Appl. No.: 527,548

[22] Filed: Aug. 29, 1983

[51] Int. Cl.³ .................... H02G 1/12; H01B 15/00
[52] U.S. Cl. .................... 83/425.2; 83/433; 83/924; 81/9.51; 29/403.3
[58] Field of Search ............. 81/9.51, 9.5 R; 83/924, 83/433, 885, 425.2; 29/403.3

[56] References Cited

U.S. PATENT DOCUMENTS

| | | | |
|---|---|---|---|
| 2,485,518 | 10/1949 | Vermette | 83/924 |
| 3,175,430 | 3/1965 | Smith et al. | |
| 3,817,132 | 6/1974 | Emery et al. | |
| 4,015,497 | 4/1977 | Burgess | 81/9.51 |
| 4,181,047 | 1/1980 | Bitting et al. | |

FOREIGN PATENT DOCUMENTS

| | | | |
|---|---|---|---|
| 133011 | 11/1978 | Fed. Rep. of Germany | 81/9.51 |
| 618927 | 3/1961 | Italy | 83/924 |
| 225280 | 6/1924 | United Kingdom | 81/9.51 |
| 474068 | 12/1975 | U.S.S.R. | 83/924 |

Primary Examiner—Roscoe V. Parker
Attorney, Agent, or Firm—Don P. Bush

[57] ABSTRACT

Apparatus for stripping cable of its outer sheathing includes first and second drive wheels, each having a non-rotating cutter blade extending beyond the wheel periphery. The amount of extension of the cutters is adjustable, and they are located on an imaginary line joining the centers of the wheels, hence cutting takes place in the region of maximum support for, and maximum pull on the cable.

12 Claims, 15 Drawing Figures

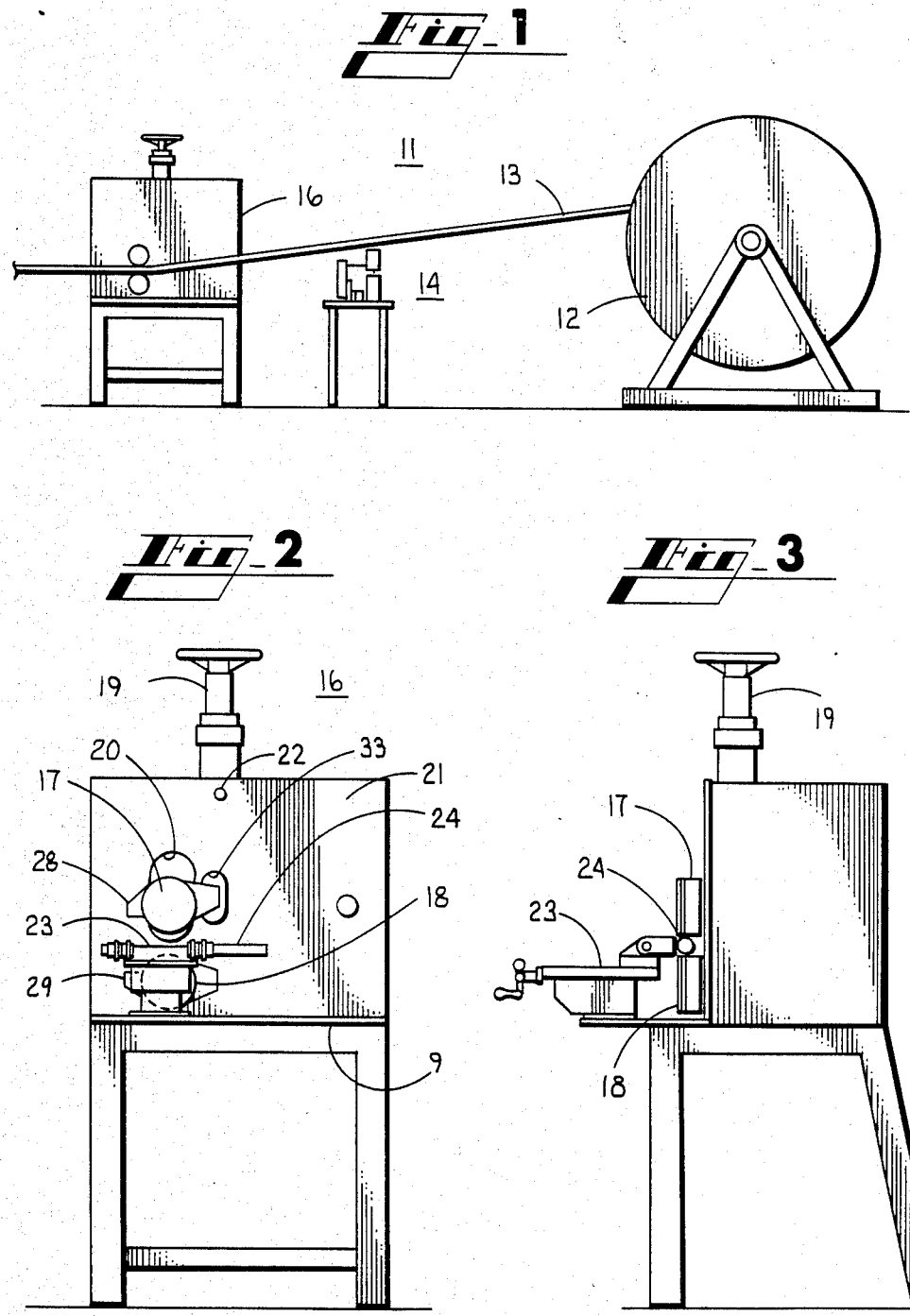

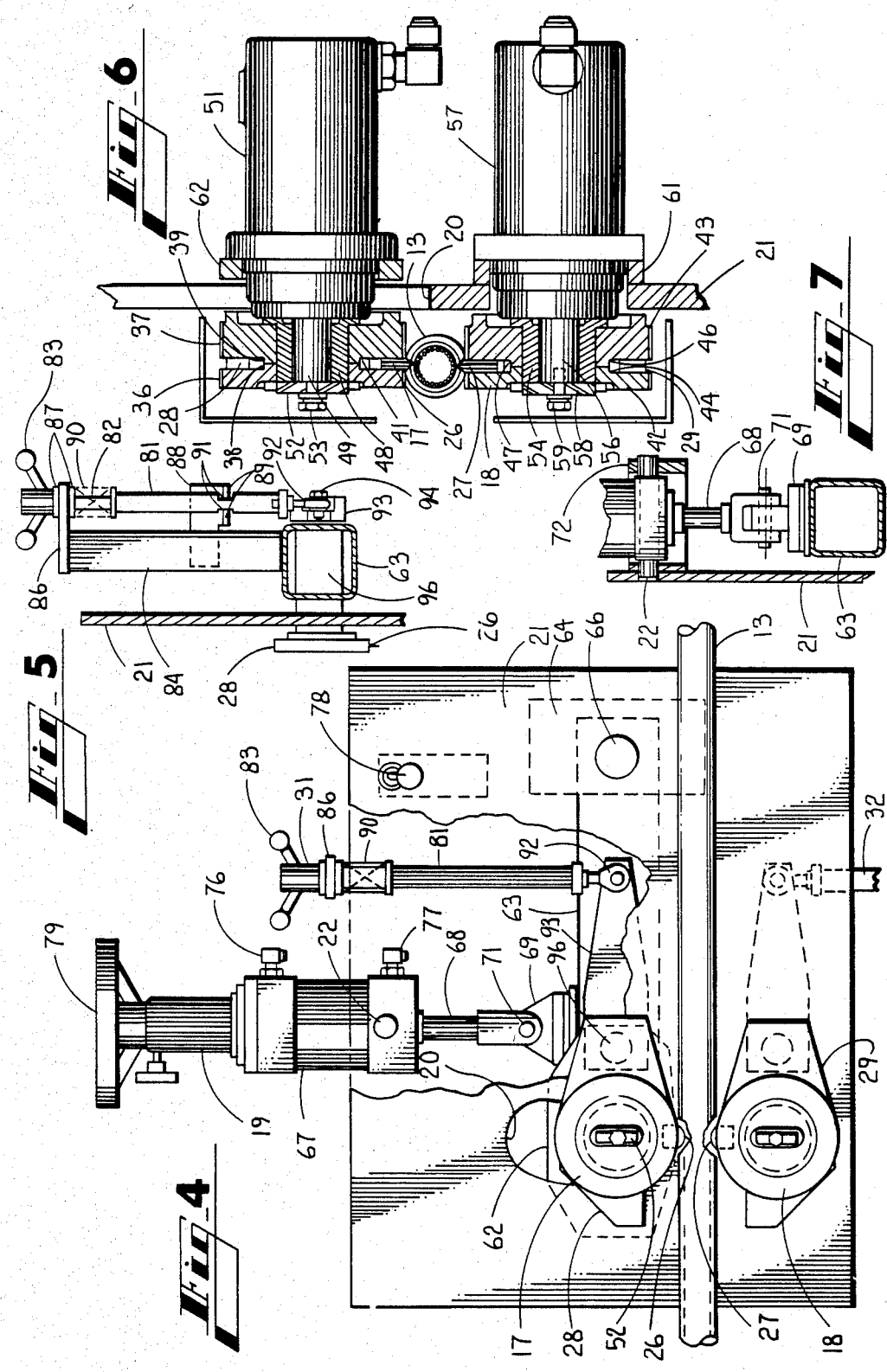

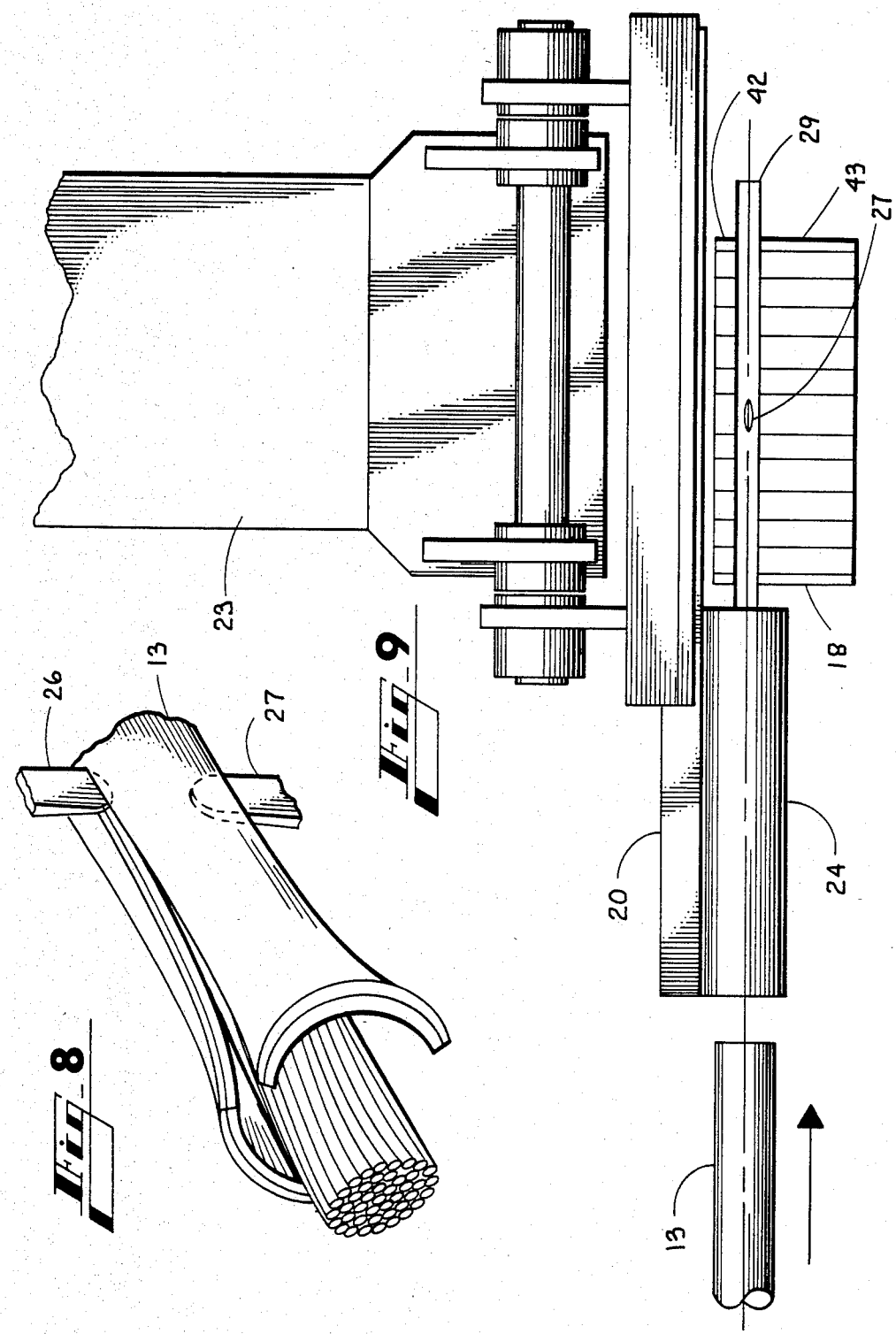

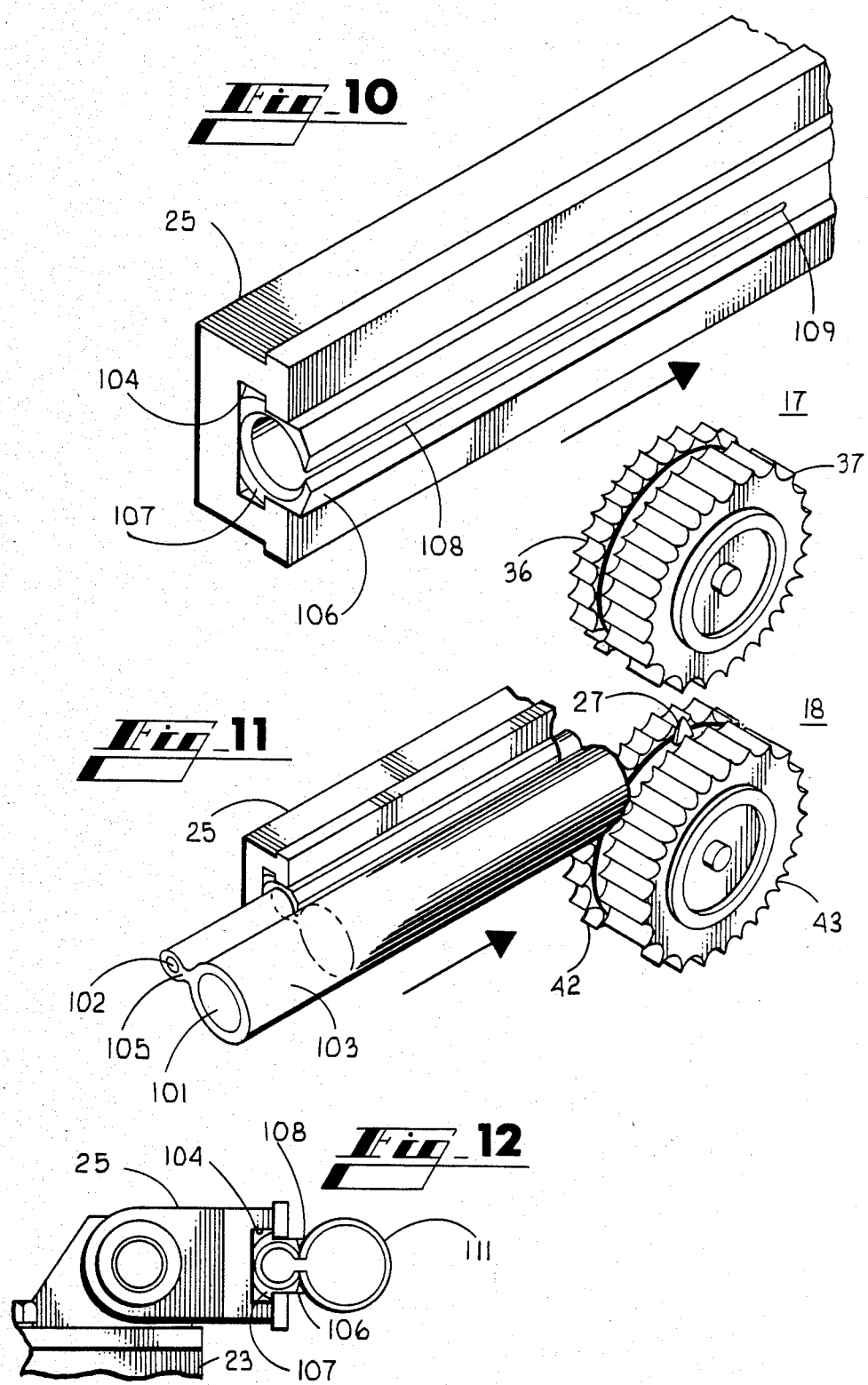

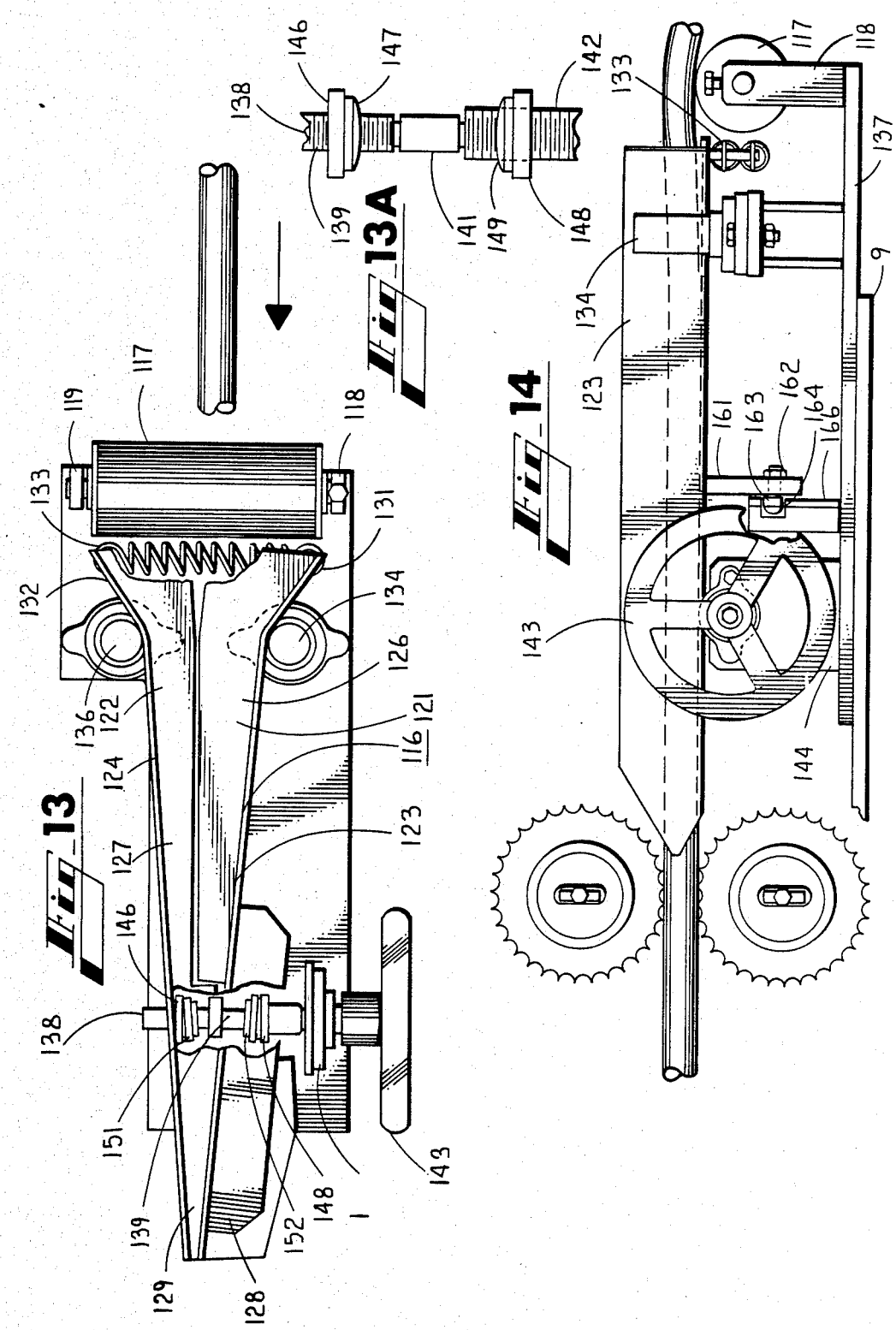

CABLE STRIPPING APPARATUS

TECHNICAL FIELD

This invention relates to apparatus for stripping electrical cable, and, more particularly, to apparatus for removing the outer jacket and metallic shield from multiconductor communications cables.

BACKGROUND OF THE INVENTION

Generally, communication cables comprise a core of insulated conductors ranging from a very small number to a very large numbers of conductors. The core is generally surrounded by a MYLAR wrap then usually a metallic sheath and an outer sheath of, for example, polyethylene. The metallic sheath may be of suitable material for the environment in which the cable is to be used, such as aluminum or various steel alloys, or it may be eliminated altogether.

In reclaiming the component elements of such a cable, it is customary to strip the metallic and plastic outer sheaths lengthwise of the cable on a continuous basis. In U.S. Pat. No. 3,175,430 of Smith et al there is shown an arrangement for accomplishing this, in which the element for cutting the outer sheath comprises a blade having a shoe which rides between the core and the sheath. Such spade or plow type cutters have several disadvantages among which are the inability to operate well with very small, e.g. one inch, diameter cables. Further it can be seen that the cutter is located beyond the cable driving wheels, hence, being in a region of less than maximum support for the cable, it is difficult to adjust accurately as to depth of cut. Also, to prevent buckling of the cable between drive wheels and cutter, it is necessary to add additional support means for the cable in the region of the cutter. Such a cutter arrangement only cuts the sheath on one side, and, although not clearly shown in the Smith et al patent, the core must be pulled from the slit circular sheath which, especially in the case of gel filled cable, can present difficulties.

This latter shortcoming is not the case in the apparatus shown in U.S. Pat. No. 3,817,132 of Emery et al, wherein the sheath is cut lengthwise on two sides of the cable. However, the mechanism of the Emery et al patent employs a show for each cutter, thus making operation on small size cables difficult. In addition, at the point of cutting, the only support for the cable along the plane of the cut is the second cutter, which makes it difficult to achieve a precise depth of cut since, as can be appreciated, the cutters are, in effect pushing against each other. Preciseness of the cut is desirable since, if the cut is too shallow, the sheath will not be completely cut through, whereas, if the cut is too deep, the individual wires in the core may be cut or tangled, causing a bunching at the cutter and subsequent stoppage.

The Emery et al patent discloses the use of rotatable cutters, which have their own unique disadvantages. Unless such cutters are extremely sharp, and maintained thus, a rotating cutter will dent, but not reliably cut, a particularly tough metal sheath. A great deal of cutter pressure on the cable is needed to insure a clean cut, but such pressure deforms the cable, and, once the metallic sheath is cut, the cable tends to spring back, causing the cutter to cut into the core and its individual wires. Where as in Emery et al, the two cutters are pushing against each other, this can lead to a great deal of damage to the cable, and possibly the cutters and the machine.

It often happens that aerial cable is to be reclaimed. Aerial cable includes, in addition to the cable components already discussed, a continuous support or strength member of steel wire rope, for example, enclosed within the outer plastic sheath, but otherwise separated from the remainder of the cable. Obviously the various arrangements thus far discussed require that the wire rope be removed prior to their operation on the cable, since they make no accommodation for the rope. An apparatus that is capable of removing the wire rope simultaneously with the removal of the metallic and plastic sheaths of the cable is obviously to be preferred.

SUMMARY OF THE INVENTION

The present invention is an apparatus which is capable of accurately slitting the outer sheaths of the cable while avoiding damage to the cable core. In addition, the apparatus of the invention can operate on a wide range of cable sizes, and is capable also of separating a supporting member from the cable while slitting the cable sheaths.

Such apparatus comprises a pair of split driving wheels for pulling the cable through the apparatus cutting area, and a cutter mounted in each wheel within a groove defined by the split wheels. With such an arrangement, the cable receives maximum support at the cutting point, while the cutting point itself is located at the region of maximum drive power of the driving wheels. The cutters are located along the axis joining the centers of the wheels, and are adjustable along this axis, but independently of the wheels. Such an independent adjustment allows very accurate settings of the cutter blades and assures a cutting accuracy regardless of the thickness of the sheaths being cut. Although the blades are adjustable independently of the wheels, once set they move up and down with the wheels as they adjust to or are adjusted to changes in cable size or diameter.

The cable is guided into engagement with the drive wheels by an adjustable guide member. In one embodiment of the invention, the guide member is provided with a slot having a cutting edge at the bottom thereof for cutting the webbing between the strength member and the cable of an aerial cable.

These and other features of the present invention will be more readily understood from the following detailed description read in conjunction with the accompanying drawings, in which:

FIG. 1 is an elevational view of a cable stripping station;

FIG. 2 is an elevation view of the cable stripper embodying the principles of the present invention;

FIG. 3 is a side view of the stripper of FIG. 2;

FIG. 4 is an elevation view partially cut away, illustrating a portion of the stripping arrangement;

FIG. 5 is a detail sectional view of a portion of the mechanism of FIG. 4;

FIG. 6 is a detail sectional view of another portion of the mechanism of FIG. 4;

FIG. 7 is a detail sectional view of still another portion of the mechanism of FIG. 4;

FIG. 8 is a perspective view of the cutting action of the present invention;

FIG. 9 is a plan view of a cable guiding portion of the mechanism of FIG. 2;

FIG. 10 is a perspective view of a cable guide for aerial cable;

FIG. 11 is a perspective view of the cutting region as shown with aerial cable;

FIG. 12 depicts an alternative guiding arrangement for aerial cable;

FIG. 13 is a plan view of an adjustable cable guide;

FIG. 13A is a detail of elements of the guide of FIG. 13; and

FIG. 14 is an elevation view of the guiding mechanism of FIG. 13.

FIG. 1 depicts the apparatus of the invention along with associated apparatus to constitute a cable jacket removing station 11. Station 11 comprises a rotably mounted reel 12 of cable 13 which is to have its outer sheath or sheaths removed. A cutting station 14 is interposed between the reel 12 and the jacket stripping apparatus 16 of the present invention. The cable 13 contained on reel 12 is almost without exception used cable, and, therefore, may contain splice cases or other apparatus added in the field that are incapable of passing through apparatus 16. In such case, cutter 14 is used to cut the cable before and after the splice case, for example, thereby removing it from the cable.

The cable jacket slitting apparatus 16 embodying the principles of the present invention, can best be seen and its construction and operation understood from FIGS. 2 through 8. FIG. 2 is a front elevation view of the apparatus 16 showing a pair of drive wheels 17, 18, wheel 17 of which is adjustable by means of an adjusting mechanism 19 which is pivotally mounted to the front plate 21 by a trunion 22. Clearance for movement of wheel 17 is provided by slot 20 in front plate 21. The purpose and operation of mechanism 19 will be more fully understood hereinafter.

A screw actuated horizontal traversing head 23 is mounted adjacent wheels 17 and 18 and carries a cable guide 24 for guiding the cable into the region between wheels 17 and 18. In that region are located cutters 26 and 27 carried by cutter heads 28 and 29 and which are adjustable relative to wheels 17 and 18 by means of adjusting mechanisms 31 and 32, only 31 being shown in detail in FIGS. 4 and 5. A slot 33 is provided in front plate 21 to permit movement of cutter head 28 as wheel 17 is adjusted, as will be explained more fully hereinafter. Traversing head 23 makes it possible to adjust the position of the guide 24 and hence insures precise positioning of the cable relative to the cutter blades 26 and 27 as the cable approaches and enters the cutting region. The guide 24 serves the additional function of preventing any buckling or bending of the cable as it approaches the cutters 26 and 27. Most importantly, however, it prevents any lateral movement of the cable, or skewing thereof, as it enters the cutting region.

The basic structure of the cutting arrangement of the present invention can best be understood by reference to FIGS. 4 through 7. Drive wheel 17 is made of two parts, an outer, relatively narrow wheel 36 and an inner relatively wider wheel 37 with shoulders 38 and 39 forming a gap 41 between wheels 36 and 37. Wheel 18 is constructed in the same manner, with narrow wheel 42, wider wheel 43, shoulders 44 and 46, and gap 47. Wheel 17 is mounted on a sleeve 48, which in turn is mounted on the drive shaft 49 of a hydraulic motor 51 and secured in place by a clamping member 52 held in place by suitable means, such as bolt 53. In a like manner, wheel 18 is mounted on sleeve 54 which is mounted on drive shaft 56 of hydraulic motor 57 and secured in place by member 58 and bolt 59. Motor 57 is mounted by suitable means, not shown, to a mounting bracket 61 which is, in turn, mounted to plate 21 by suitable means, likewise not shown. Motor 51, on the other hand, is mounted to a plate member 62, as by clamping or bolting, for example, which is, in turn, mounted to a tubular arm 63. To avoid complications, the standard hydraulic supply and motor controls have not been shown.

Arm 63 is pivotally mounted at one end to plate 21 by means of a bracket 64, shown schematically as a dotted outline, and pin 66. Thus the end of arm 63 to which plate 62 is affixed is moveable up and down, with slot 20 providing clearance for such movement. Movement of arm 63, and hence the up and down movement of plate 62, motor 51, and wheel 17 is controlled by adjusting mechanism 19 which comprises a pneumatic cylinder 67 having a piston (not shown) therein connected to a shaft 68 which is pivotally mounted to arm 63 by bracket 69 and pin 71. Bracket 69 may be welded bolted or otherwise suitably attached to arm 63. Cylinder 67 is pivotally mounted on plate 21 by means of a bracket 72, which may be welded or bolted to plate 21, and trunion 22. The pneumatic cylinder 67 and piston act as a spring for forcing wheel 17 down into contact with the cable, but permitting wheel 17 to move in response to diameter variations in the cable.

Pneumatic valves 76 and 77 control the ingress and egress of air into cylinder 67, and hence the rate of movement of the piston therein, which in turn governs the up and down movement of arm 63. An air control valve knob 78 enables the operator to raise and lower arm 63, and hence wheel 17. For simplicity, the air source and valves controlled by knob 78 have not been shown, being of standard design well known in the art. Fine adjustment of the position of arm 63 and hence wheel 17 is not normally required because of the spring action of cylinder 67 and its piston. However, where compression of the cable needs to be limited, a fine adjustament of the lowest position of wheel 17 may be achieved by adjusting wheel 79, which is connected to the piston, and when turned, governs the amount of downward travel of wheel 17.

Cutters 26 and 27 are adjustable relative to wheels 17 and 18 respectively by means of adjusting mechanisms 31 and 32. Mechanisms 31 and 32 are substantially the same, hence only mechanism 31 and its control of cutter 26 will be described with reference to FIG. 5. Mechanism 31 comprises rod shaped member 81 with externally threaded portion 82, an internally threaded handle 83 spherical washer assemblies 87, 87 and cutter retraction spring 90. A standard 84 is mounted on arm 63 and extends upright substantially parallel to member 81. Crosspiece 86, attached at the top of standard 84 supports the upper end of mechanism 31 by means of a hole through threaded portion 82 passes, and handle 83 and spring 90 bear against, with spherical washers 87, 87 providing a flat bearing surface at any angle. Thus, knob 83 is rotated, only member 81 moves vertically compressing or decompressing spring 90. A bracket 88, attached to standard 84 serves to prevent rotation of member 81 by means of flanges 89, which extend into elongated flats 91, 91 in member 81 while not limiting vertical movement. An eyelet 92 which extends from the bottom of member 81 and is affixed thereto, is connected to an arm 93 by a bolt 94. The other end of arm 93 is connected to cutter head 28 by means of by a large pivot pin 96 which extends through holes in arm 63, through slot 33 in plate 21 and is affixed to one end of cutter head 28. When handle 83 is rotated, member 81 moves vertically thus raising or lowering the end of arm 93 and thereby lowering or raising cutter head 28 and cutter 26. Cutter head 28 is free to move within the slot 41 of wheel 17, thus cutter 26 can be adjusted for the depth of the cut taken in the cable jacket, as seen in FIG. 6.

The cable is pulled through the cutting area, where the cutters 26 and 27 are rigidly held relative to their related wheels 17 and 18 directly on the axis joining the wheel centers, by wheels 17 and 18, which have serrated or toothed surfaces for gripping the cable. Hydraulic motors 51 and 57, being a high torque with low revolutions per minute design, eliminate the need for speed reducing transmissions required by electric motors, which insure a steady pull on cable 13 as it is passed through the cutting area and as its outer jacket and metal sheath are forced against the sharp edges of cutters 26 and 27. Irregularities in the diameter of the cable do not affect the depth of cut, since the air in cylinder 67 acts as a spring, and permits wheel 17 and hence cutter 26 to move up or down slightly to accommodate the diametric irregularities.

From the foregoing description, it can be appreciated that with the wheel 17 being self-adjusting the cutters 26 and 27 having fine adjustments, and with the fixed relationship of the cutters 26 and 27 relative to wheels 17 and 18 respectively, after adjustment, that it is possible to achieve great accuracy in the depth of cut. Furthermore, the guide tube 24 and wheels 17 and 18 insure accurate and precise feeding of cable 13 into and through the cutting area, where the cut is taken at the exact point of maximum support of the cable by the wheels 17 and 18.

In FIG. 8 is shown the results of such an arrangement. Cutters 26 and 27 cut the outer sheaths of cable 13 to precisely the desired depth, leaving the core undamaged, and, since the sheath is cut in two diametrically opposed locations, it is a simple matter to separate the sheath material from the core. Sometimes, especially with gel filled cable, separation may became difficult in cold temperatures, for example, or any other circumstance where the gel would tend to harden. In such case it might be desirous to attach to the machine 16 a pair of separators, such as the plow type separator, at some point past the cutting region, to break the sheath loose from the core.

FIG. 9 is a plan view of the relationship of the guide member 24 to the cutting area. Only wheel 18 and cutter 27 are shown, wheel 17 having been omitted for clarity. As can be seen, the cable is guided right up to the wheel 18 so that it is accurately positioned at the moment it is gripped by the serrations on the wheel 18, and fed against cutter 27. Guide 24 has an elongated key member 20 which fits in a slot carried by a pivoted head 25 mounted on traversing head 23 and thus can be precisely positioned by adjustment of the traversing head 23.

Thus far the description of the invention has dealt with the stripping of conventional cable. One of the advantages of the machine of the present invention is its ready adaptability to stripping aerial cable, i.e., cable having a separate wire rope support member which is integrally incorporated into the insulating jacket, giving the cross section of the cable a roughly figure eight shape, as best seen in FIG. 11. The cable shown in FIG. 11 comprises a central core 101, a wire rope support member 102, and an outer jacket 103. A necked down portion 105 of jacket 103 separates the two portions of the cable. As pointed out heretofore, it is desirable to separate the wire rope from the body of the cable prior to or simultaneously with the cutting of the jacket 103. This can be readily accomplished by the arrangements shown in FIGS. 10 through 12. Pivoted head 25, which for simplicity has been shown without its pivoted connection to traversing head 23, has a T-shaped keyway or slot 104 extending the length thereof. A cylindrical guide member 106 has a T-shaped key 107 which fits into slot 104 so that member 106 is held firmly in place. A slot 108 extends a portion of the length of member 106 and has a slot width sufficient for web or necked down portion 105 to move freely therein in the direction of the arrow and is terminated by a sharp cutting edge 109. Referring to FIG. 11, the operation of the arrangement of FIG. 10 can be readily understood. That portion of the cable in which wire rope 102 is located is fitted into cylindrical guide member 106, with web 105 being fitted in slot 108. As the cable is pulled through the cutting area by wheels 17 and 18, the web 105 encounters and is cut by the sharp edge 109, thereby separating it and wire rope 102 from the cable, while the rest of the cable proceeds through the cutting area in the direction of the arrow, where its jacket is cleanly cut on both sides thereof.

FIG. 12 depicts a modification of the arrangment of FIGS. 10 and 11, wherein a cylindrical guide member 111 is attached, as by welding, to member 106. Member 111 has an interior diameter large enough to accommodate the main portion of the aerial cable of FIGS. 10 and 11, hence affording additional guiding for the cable. On the other hand, member 111 can act as a guide for regular cable not having a wire rope portion. Hence the combination of members 106 and 111 can act as a guide for either type of cable.

The guide members thus far shown are primarily designed for and work best with continuous cable feed. It is often the case, however, in cable reclamation, that several relatively short lengths of cable, of various diameters, need to be stripped. In such a case, it is desirable to be able to accommodate the differing diameters with a single guide rather than changing guide for each diameter of cable.

In FIGS. 13 and 14 there is shown an adjustable guide arrangement 116 for handling various diameters of cable. Guide 116 replaces traversing head 23 and is mounted on bed 9 of the stripper 16. Guide 16 comprises a roller 117 mounted between two uprights 118 and 119 in bearings so that it can turn freely. First and second tapered L-shaped members 121 and 122, comprising upright members 123 and 145 respectively and horizontal members 126 and 127 respectively, are arranged so that the end 128 of member 121 is free to slide over end 129 of member 122. Ends 128 and 129 are adjacent to the input side of the cutting regions. The opposite ends 131 and 132 of members 121 and 122 are flared to provide access and to center the cable as it enters the guide 116. A spring or springs 133 provide tension and also serve to hold the two ends 131 and 132 together. Stepped pivot pins 134 and 136 are mounted on the base 137 and act as fulcrums and supports for members 121 and 122.

Adjustment of the opening formed by ends 128 and 129, and hence the guiding of the cable, is achieved by means of an adjusting screw 138, the details of which are best seen in FIG. 13A. Screw 138 comprises a first threaded portion 139 of a first diameter of thread pitch, a second unthreaded portion 141 and and third threaded portion 142 of a larger diameter and greater thread pitch than portion 139. Screw 138 is turned by adjusting wheel 143 mounted in a bearing stanchion 144. Mounted on threaded portion 139 is a flat sided nut 146 having a convex bearing surface 147. In like manner, a flat sided nut 148 having a convex bearing surface 149 is mounted on threaded portion 142. Screw 138 is supported at a portion 141 by a bearing stanchion 151.

When the adjusting wheel 143 is turned, screw 138 also turns. One flat side of both nut 146 and nut 148 bears against the underside of members 122 and 121 respectively, hence neither nut 146 nor nut 148 can turn, but both can move inwardly or outwardly along screw members 138, depending upon the rotation direction of wheel 143. Nut 148 moves at a slightly greater rate than nut 146 because of the greater thread pitch of portion 142. This is because members, 122, being closely adjacent plate 21, is limited in it outward movement, hence, for extremely large diameter cable, accommodation thereof can only be achieved by having nut 148 move more, and, as will be seen, member 121 will likewise move more than member 122.

In order that the movement of nuts 146 and 148 can be translated into movement of numbers 121 and 122, a bearing member 151, having a concave surface to match the convex surface 147 of nut 146 is mounted on the underside of member 122. Member 151 has a hole drilled therethrough to provide clearance for screw 138. In like manner, a similar bearing member 152 is mounted on the underside of member 121. The tension supplied by spring 133 insures that member 151 bears against surface 147 of nut 146 and member 152 bears against surface 149 of nut 148. As a consequence, any movement of nuts 146 and 148 is translated to and causes similar movement of members 122 and 121 respectively. With such an arrangement, a wide diversity of cable diameter can be handled for accurate guiding into the cutting region.

Because of the length of members 121 and 122, it is desirable that they be supported in the adjusting region, i.e. near screw 138. To this end, a vertical arm 161 is attached to members 121. At the bottom of arm 161 is a bearing hole in which a shaft 162 is free to rotate. Attached to one end of the shaft is a roller 163 which ride in a track 164 formed in an upright 166. Since the movement of member 121 is in an arc, track 164 has a depth sufficient to clear roller 163 regardless of the position of member 121. Member 122 is supported in the same manner, but, for simplicity the support means has not been shown.

The foregoing has been by way of illustrating the principles of the present invention as embodiment in a particular apparatus. Other apparatus embodying these same principles may occur to those skilled in the art without departure from the spirit and scope of the present invention.

What is claimed is:

1. Apparatus for stripping the outer layers from cable comprising drive means including:
   first and second drive wheels for pulling the cable through the cutting region of the apparatus;
   first stationary cutting means located within a slot in said first drive wheel and extending beyond the periphery thereof toward said second drive wheel;
   second stationary cutting means located within a slot in said second drive wheel and extending beyond the periphery thereof toward said first drive wheel;
   said drive wheels and said cutting means defining the cutting region of said apparatus;
   means associated with said first cutting means for adjusting the distance said cutting means extends beyond the periphery of said first drive wheel;
   means associated with said second cutting means for adjusting the distance said cutting means extends beyond the periphery of said second drive wheel;
   said first and second cutting means being located along an imaginary line joining the rotational axes of said first and second drive wheels;
   means associated with said first drive wheel for permitting said wheel to be moved up and down in response to diametric variations in cable diameter;
   means connected to said last mentioned means for controlling the rate of up and down movement of said first wheel and said first cutting means as cable passes through the cutting region;
   a first motor connected to said first drive wheel; and
   a second motor connected to said second drive wheel, both of said motors being characterized by high torque and low revolutions per minute, said first motor being moveable with said first drive wheel.

2. Apparatus for stripping the outer layers from cable comprising drive means including:
   first and second drive wheels for pulling the cable through the cutting region of the apparatus;
   first stationary cutting means located within a slot in said first drive wheel and extending beyond the periphery thereof toward said second drive wheel;
   second stationary cutting means located within a slot in said second drive wheel and extending beyond the periphery thereof toward said first drive wheel;
   said drive wheels and said cutting means defining the cutting region of said apparatus;
   means associated with said first cutting means for adjusting the distance said cutting means extends beyond the periphery of said first drive wheel;
   means associated with said second cutting means for adjusting the distance said cutting means extends beyond the periphery of said second drive wheel;
   said first and second cutting means being located along an imaginary line joining the rotational axes of said first and second drive wheels; and
   said first and second cutting means being located along an imaginary line joining the rotational axes of said first and second drive wheels;
   means associated with said first drive wheel for permitting said wheel to be moved up and down in response to diametric variations in cable diameter;
   means connected to said last mentioned means for controlling the rate of up and down movement of said first wheel and said first cutting means as cable passes through the cutting region;
   said means connected to said means associated with first drive wheel for permitting said wheel to be moved up and down in response to diametric variations in cable diameter comprises a pneumatic cylinder having a piston therein, said piston being directly connected to said means for permitting the first drive wheel to be moved up and down, and means for introducing air into said cylinder whereby the air within the cylinder acts, in conjunction with the piston, as a spring controlling the rate of up and down movement of said first drive wheel and said first cutting means as cable passes through the cutting region.

3. Apparatus for stripping the outer layers from cable comprising:
drive means including:
first and second drive wheels for pulling the cable through the cutting region of the apparatus;
first stationary cutting means located within a slot in said first drive wheel and extending beyond the periphery thereof toward said second drive wheel;
second stationary cutting means located within a slot in said second drive wheel and extending beyond the periphery thereof toward said first drive wheel;
said drive wheels and said cutting means defining the cutting region of said apparatus;
means associated with said first cutting means for adjusting the distance said cutting means extends beyond the periphery of said first drive wheel;
means associated with said second cutting means for adjusting the distance said cutting means extends beyond the periphery of said second drive wheel;
said first and second cutting means being located along an imaginary line joining the rotational axes of said first and second drive wheels;
means associated with said first drive wheel for permitting said wheel to be moved up and down in response to diametric variations in cable diameter; and
means connected to said last mentioned means for controlling the rate of up and down movement of said first wheel and said first cutting means as cable passes through the cutting region; and
means for separating a supporting member from the cable including:
a tubular member through which the support means is directed, and
a slot in the wall of said tubular member extending along a portion of the length thereof, the bottom of said slot having a cutting edge, whereby the material joining the supporting member to the cable is cut by the cutting edge and the supporting member is thereby separated from the cable.

4. Apparatus as claimed in claim 3 and further including a guide member attached along at least a portion of the length of said tubular member for substantially preventing lateral movement of the cable as it enters the cutting region.

5. A machine for stripping the outer sheathing from a cable comprising:
a first split drive wheel comprising first and second shouldered portions abutting each other to form a circumferential groove in said first drive wheel;
a cutter head located within the groove and being moveable therein;
a cutter rigidly mounted on said cutter head and extending beyond the periphery of said first drive wheel;
a pivoted arm having a free end, said arm being pivoted to a portion of the machine at a point remote from its free end and said first drive wheel;
a first drive motor mounted on a plate carried by said arm at the free end thereof remote from the point where said arm is pivoted;
means connecting said first drive wheel to said first drive motor, whereby said first motor and said first drive wheel move together with the free end of said arm;
means connected to said arm for controlling the rate of movement of the free end thereof;
means for adjusting the position of said cutter head and hence the amount that said cutter extends beyond the periphery of said first drive wheel comprising;
a pivot pin connected to one end of said cutter head, said pivot pin extending through said arm and pivotable therein;
an adjusting arm connected at one end to said pivot pin and at its other end to an adjusting mechanism;
the adjusting mechanism comprising a rod member having one end pivotally connected to said adjusting arm being threaded at its other end, said rod member being held in place in the machine by means preventing its rotation;
means for moving said rod member up and down whereby the end of said adjusting arm is moved up or down causing said cutter head to move the opposite way;
a second split drive wheel comprising first and second shouldered portions abutting each other to form a circumferential groove in said second drive wheel, a second cutter head located within the groove and being moveable therein;
a cutter rigidly mounted on said second cutter head and extending beyond the periphery of said second drive wheel;
a second drive motor mounted on said machine;
means connecting said second drive wheel to said second drive motor;
means for adjusting the position of said second cutter head relative to said second drive wheel;
said second drive wheel and said second cutter head being located directly below said first drive wheel and said first cutter head such that the cutters carried by the said first and second cutter heads are located on an imaginary line joining the axes of said first and second drive wheels; and
means for guiding the cable into the cutting region defined by said drive wheels and said cutters while minimizing lateral shifting of the cable.

6. A machine as claimed in claim 5 wherein said means for guiding is mounted on an adjusting head whereby said means for guiding can be precisely positioned.

7. A machine as claimed in claim 5 wherein said means for guiding comprises a slotted tubular member, the bottom of the slot having a cutting edge for cutting a portion of the jacket material of the cable.

8. A machine as claimed in claim 7 and further including a second tubular member extending along at least a portion of the length of said slotted tubular member and communicating with the slot in said slotted member whereby a portion of the cable passes through both tubular members.

9. A machine as claimed in claim 5 wherein said means for guiding comprises a pair of members forming a channel having a cable entrance end and a cable exit end, and means for adjusting the width of the exit end of the channel.

10. Guide means for guiding cable into a cutting region while minimizing lateral shifting of the cable as it enters the cutting region comprising:
first and second elongated members having an L-shaped cross-section, said members being disposed side by side to form a channel along which the cable is intended to pass, the channel having an entrance end and an exit end for the cable:, said elongated members each having a flared end at the entrance end of said channel, the flared end forming an angle with the remainder of the elongated member;

pivot means located at the point of angular change of each of said elongated members;

adjusting means for adjusting the separation of the ends of said elongated members forming the exit end of the channel;

tensioning means at the entrance end of the channel connected to said elongated members to cause them to bear against a portion of the adjusting means whereby said adjusting means causes the width of the exit end of the channel to vary to accommodate varying sizes of cable.

11. Guide means as claimed in claim 10 and further including supporting means for said elongated members, said supporting means including means moveable with each of said elongated members, and stationary means along which said moveable means travel when said elongated members are adjusted.

12. Guide means as claimed in claim 10 wherein said adjusting means comprises an elongated rod member having first and second threaded portions, a flat sided nut having a convex surface thereon on each of said threaded portions so oriented that the convex surfaces of the nuts face each other, said rod member having a central unthreaded portion between said threaded portions;

a stationary bearing member through which the unthreaded portion passes, a first bearing member fixed to said first elongated member and having a concave bearing surface matching the convex surface of the nut adjacent thereto;

a second bearing member fixed to said second elongated member and having a concave bearing surface matching the convex surface of the nut adjacent thereto;

and means for rotating said rod member whereby the matching surface bear against each other and the elongated members are caused to move by movement of said nuts.

* * * * *